United States Patent Office 3,546,102
Patented Dec. 8, 1970

---

3,546,102
CATALYST AND REFORMING PROCESS EMPLOYING SAME
Ralph J. Bertolacini, Chesterton, Ind., assignor to Standard Oil Company, Chicago, Ill., a corporation of Indiana
No Drawing. Continuation-in-part of application Ser. No. 491,017, Sept. 28, 1965. This application Sept. 26, 1969, Ser. No. 861,474
Int. Cl. C10g *35/08;* B01j *11/40*
U.S. Cl. 208—138
25 Claims

ABSTRACT OF THE DISCLOSURE

The catalyst comprises a co-catalytic solid support and a Group VIII metal. The support consists essentially of (1) an adsorbent refractory inorganic oxide and (2) mordenite, the mordenite having been introduced into the adsorbent refractory inorganic oxide by blending the mordenite in a finely divided state into a sol or gel of the adsorbent refractory inorganic oxide prior to drying to form a mordenite-inorganic-oxide blend and the Group VIII metal having been incorporated into the mordenite-inorganic-oxide blend after the blending and prior to drying and calcining. The preferred inorganic oxide is alumina and the preferred Group VIII metal is platinum. The reforming process comprises contacting the hydrocarbons under hydroforming conditions with the above catalyst.

CROSS-REFERENCE TO RELATED APPLICATION

The present application is a continuation-in-part application of copending application S.N. 491,017, which was filed on Sept. 28, 1965, now abandoned.

DESCRIPTION AND PREFERRED EMBODIMENTS

This invention relates to hydrocarbon conversion catalysts and more particularly, to such catalysts which contain a particular form of zeolite and to hydrocarbon conversion processes utilizing such catalysts.

Group VIII metal-containing catalysts have been employed on a commercial scale in a wide range of reactions, most of them involving hydrogenation, dehydrogenation, oxidation, isomerization, and dehydrocyclization. Especially successful has been the use of alumina-supported platinum catalysts in the conversion of low-octane petroleum naphthas under hydroforming conditions into gasolines of high anti-knock rating. In a typical platinum-hydroforming process, a mixture of charging stock and hydrogen-containing gas is passed through a bed of platinum-alumina-halogen catalyst containing between about 0.05 to 1% by weight of platinum. The hydroforming reactions are carried out at a temperature in the range of about 800 to 1,000° F., a total pressure between about 100 and 1,200 pounds per square inch gauge, a hydrogen partial pressure between about 50 and 1,000 pounds per square inch, a hydrogen rate of 2,000 to 10,000 standard cubic feet per barrel of charging stock, and a weight hourly space velocity between about 0.5 and 10.

The activity and selectivity of hydrocarbon conversion catalysts depend upon a variety of factors, such as the identity and condition of the catalyst components, the mode of catalyst preparation, the presence or absence of promoters and modifiers, the presence or absence of contaminating materials in the charging stock and the proportion thereof, the conversion temperature, the hydrogen partial pressure in the conversion zone, and the like. Suitable catalysts are conveniently prepared by commingling a Group VIII metal compound with a hydrous adsorbent refractory inorganic oxide, such as alumina, and thereafter drying and calcining. A new catalyst composition has now been discovered which affords a hydrocarbon conversion catalyst of greatly improved catalytic properties.

Accordingly, this invention provides a hydrocarbon conversion catalyst comprising a co-catalytic solid support containing a Group VIII metal, which support consists essentially of (1) adsorbent refractory inorganic oxide and (2) mordenite structure zeolite. A preferred adsorbent refractory inorganic oxide is alumina. The support contains 0.1 to 25 weight percent, preferably about 0.5 to 5 weight percent of the mordenite. Group VIII metals which are particularly useful are the noble metals. Platinum is a preferred Group VIII metal.

In another aspect, the invention provides a hydrocarbon conversion catalyst comprising a support having as major ingredients about 0.1 to about 25 weight percent of mordenite structure zeolite and about 75 to about 99.9 weight percent of an adsorbent refractory metal oxide, said support containing a Group VIII metal; said zeolite being in a form selected from the class consisting of the unexchanged cation form and ion-exchanged form containing at least one of the following cations: cations of Group I metals, cations of Group II metals, cations of Group III metals, ammonium ions, hydrogen ions.

In still another aspect, the invention provides a process for converting hydrocarbons which comprises contacting hydrocarbons under hydrocarbon conversion conditions with a hydrocarbon conversion catalyst comprising a co-catalytic solid support containing a Group VIII metal, which support consists essentially of (1) adsorbent refractory inorganic oxide and (2) mordenite structure zeolite.

Our improved catalysts are broadly useful in hydrocarbon conversion reactions which are catalyzed by Group VIII metals. Specifically, our catalysts are useful for reforming, isomerization, hydrogenation, hydrocracking, dehydrogenation, oxidation, polymerization, condensation, and other reactions known in the art. Our catalysts are especially advantageous in the hydroforming of petroleum naphthas boiling in the range of about 180 to 400° F. and are capable of upgrading a 50% naphthenic naphtha having a research octane number of only 40 to 50 into a $C_5^+$-gasoline having a research octane number of 90 to 100 in a yield of 75 to 90%.

When employed in the reforming or hydroforming of various hydrocarbon fractions, our catalysts simultaneously effect a group of reactions, including the production of 6-membered ring naphthenes from other naphthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of carbon and of the unsaturated fragments, and various side reactions. All of these reactions tend to produce products containing motor-fuel fractions of improved anti-knock rating.

In utilizing the new catalysts of this invention for the continuous reforming of hydrocarbons, a feedstock consisting essentially of a virgin naphtha, a cracked naphtha, or a mixture thereof, boiling within the range of about 70 to about 500° F., and preferably within the range of about 180 to 400° F. is contacted in the vapor phase with the catalysts at a temperature within the range of about 800 to 1,050° F., the average temperature throughout the catalyst bed being maintained within the range of about 875 to 950° F., preferably around 900° F. The process is operated at a pressure within the range of about 200 to 1,000 pounds per square inch, preferably from about 200 to 400 pounds per square inch.

Hydrogen is included within the reaction zone, ordinarily by recycle, in the range of about 2 to 8 moles of hydrogen per mole of feed, preferably between about 3 and 6 moles per mole. It is preferred to adjust the composition of our catalyst and to adjust the operating conditions so that there is at least a small net production of hydrogen, the introduction of hydrogen from an outside source being thereby rendered unneessary. This can conveniently be effected for a given catalyst composition by adjusting the proportion of naphthenes in the charging stock to produce at least enough hydrogen to saturate the materials produced by the paraffin-cracking reactions and to provide for the normal venting requirements.

The new catalysts can be employed in any of the conventional types of equipment known to the art. One may, for example, employ the catalyst in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, we may prepare the catalyst in a suitable form for use in moving beds, in which the charging stock and catalyst are preferably passed in counter-current flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

The catalysts of this invention are superior in stability, especially under adverse conditions which seriously impair the activity of prior-art catalysts, such as sulfur and nitrogen containing feeds. An important advantage of the catalysts of this invention over prior-art catalysts is that no halogen is required, thus attendant corrosion problems and halogen level maintenance problems are avoided.

The adsorbent refractory inorganic oxide base or support advantageously comprises either gamma-alumina or eta-alumina, or mixtures of these allotropic forms. These definitions of alumina are definitions adopted as standard nomenclature by Russell in his brochure entitled "Alumina Properties," Technical Paper No. 10, 1953, Aluminum Company of America, and by Stumpf et al., Ind. Eng. Chem., 42, 1950, pp. 1398-1403.

Zeolites are porous crystalline aluminosilicates and are well known in the art. Naturally occurring zeolites are, for example, chabazite, gmelinite, erionite, mordenite and faujasite. Zeolites have rigid three-dimensional anionic networks with intracrystalline channels whose narrowest cross section has essentially a uniform diameter. Zeolites are to be distinguished from crystalline aluminosilicate clays such as bentonite, which have a two-dimensional layer structure, and from amorphous aluminosilicates such as synthetic silica-alumina cracking catalyst, which has a random structure. Synthetic zeolites, designated as Type X and Type Y molecular sieves, are commercially available from Linde Company.

The zeolites are composed of alkali or alkaline earth metal oxides, alumina and silica in various proportions. In the case of a given zeolite, the intracrystalline channels, generally designated as pores, can be varied in size to a certain extent by replacing all or part of the exchangeable cations with other suitable ions by ion-exchange. The zeolites are used for drying and for separating certain hydrocarbon types, and even have been proposed as catalyst for hydrocarbon and conversion reactions such as cracking.

The zeolite employed in the catalyst of this invention is a particular form of zeolite known as mordenite. While mordenite is naturally occurring, a synthetic mordenite known as Zeolon has become available commercially from the Norton Company. Mordenite is characterized by its high silicon to aluminum ratio of about 5:1 and its crystal structure. Composition of mordenite as given in Kirk-Othmer, "Encyclopedia of Chemical Technology," vol. 12, p. 297, is (Ca, Na$_2$)

$$Al_2Si_9O_{22}6H_2O$$

The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the Formula Na$_3$Al$_3$Si$_4$O$_{14}$ is characterized by a 3-dimensional array of pores which consist of 12-13 A. cages interconnected through 8-9 A. windows.

The mordenite zeolite employed in the catalyst of the present invention may be in the unexchanged cation form containing exchangeable sodium and/or calcium ions or, other alkali metal, alkaline earth metal, or, preferably the alkali metal cations may be replaced with hydrogen ions such as by exchanging the alkali metal ions with ammonium ions and then heating to drive off ammonia leaving the mordenite in the hydrogen form. Mordenite differs from other zeolites in that substantially all the exchangeable metal cations may be replaced with hydrogen ions without causing destruction of the characteristic crystal structure.

The catalyst of this invention is prepared by forming an adsorbent refractory co-catalytic support material consisting essentially of about 0.1 weight percent to about 25 weight percent of mordenite structure zeolite and about 75 weight percent to about 99.9 weight percent of adsorbent refractory inorganic oxide and incorporating with said support material about 0.01 to about 10 weight percent of a Group VIII metal or compound thereof. A preferred adsorbent refractory inorganic oxide for use in the catalyst of the present invention is alumina. Other adsorbent refractory inorganic oxides which may be used include, for example, silica gel, silica-alumina, magnesia-alumina, zirconia-alumina, etc. The catalyst composition of the present invention may be formulated in various ways. For example, finely divided mordenite zeolite may be stirred into alumina sol, a soluble non-halogen Group VIII metal compound such as, for example (NH$_3$)$_2$Pt(NO$_2$)$_2$, added to the sol, and the sol mixture cogelled by addition of dilute ammonia and the resulting solid dried and calcined. Another way of preparing the catalyst composition is by mixing finely divided mordenite zeolite into alumina sol as above, gelling the sol by addition of dilute ammonia to produce a gel which is then dried and pelleted. The pellets are then calcined, cooled and then impregnated with a Group VIII metal solution. A third method, which is also suitable for making the catalyst composition of this invention, is to blend an alumina hydrogel and finely divided mordenite zeolite and adding to this blend a solution of the Group VIII metal and thorough blending the mixture. The resulting gel mixture is then dried, pelleted and the pellets calcined. Suitable drying conditions for use in the various catalyst manufacturing methods include a temperature in the range of about 200 to 400° F. for a time in the range of about 5 to 30 hours. Suitable calcination conditions include a temperature in the range of about 900 to 1,500° F. for a time of about 2 to 20 hours. Preferred drying and calcining conditions are a temperature of about 250° F. for about 16 hours and a temperature of about 1,000° F. for about 6 hours, respectively.

Components such as halogen, for example, other than Group VIII metals, mordenite structure zeolite, alumina and the Groups I, II and/or III metals and/or hydrogen may be present in the catalyst composition in minor amounts, usually less than about 1.0%, provided they do not exhibit undersirable physical or chemical effects on the catalyst or on any process employing the same.

EXAMPLE I

A series of catalysts was prepared from sodium form Zeolon by first exchanging various cations for the sodium in the Zeolon by conventional techniques known in the art, blending finely divided Zeolon with alumina gel, preferably high purity alumina, and impregnating the Zeolon-alumina gel blend with an aqueous solution of $(NH_3)_2Pt(NO_2)_2$. The impregnated gel was tdried at 250° F. for 16 hours and pelleted into ⅛ inch long by ⅛ inch diameter cylindrical pellets using Sterotex as a pelleting aid. The pellets were then calcined in air for 6 hours at 1,000° F. Sufficient Zeolon and platinum were used to provide 2 weight percent and 0.6 weight percent, respectively, in the final catalyst.

In a specific example of the catalyst preparation technique . . . a sample of Nalco HF-type alumina hydrogel was purified by slurrying with three separate batches of a hot solution of ammonium chloride, 150 gm. $NH_4Cl$ in 4 liters of $H_2O$. After each wash, the alumina gel was filtered and washed with hot water. The sample was then washed three times by slurrying the gel with 4 liters of hot water. Again, the gel was filtered between each wash. The washed gel was found to contain 16.8% solids.

1160 gm. of the purified gel was blended with 4 gm. of the hydrogen form of Zeolon, Zeolon-H, and 700 ml. of water. After blending well, a solution of 1.96 gm. $(NH_3)_2Pt(NO_2)_2$ in 400 ml. of hot water was blended in. The gel was dried at 250° F. for 16 hours and pelleted, ⅛" x ⅛". Sterotex was used as a pelleting aid. The pellets were calcined 6 hours at 1,000° F. This catalyst, which is a preferred embodiment of our invention, is designated Catalyst A.

Catalyst B was prepared as above, except that unexchanged sodium form of Zeolon was used in place of Zeolon-H. Other catalysts, designated C through F were prepared in this manner except that other cations were exchanged into the Zeolon replacing sodium, namely, calcium, magnesium, aluminum and barium, respectively. Catalyst G was prepared from Zeolon-H but in a higher concentration of 5 weight percent in the catalyst.

Catalyst H was made from hydrogen-exchanged Linde Y-type molecular sieves instead of mordenite (Zeolon). The Y sieve contained about 3 weight percent sodium after the hydrogen ion exchange since this type of zeolite cannot be converted completely to the hydrogen form without destroying its crystal structure.

Catalyst I was a sample of commercial platinum-alumina-chloride hydroforming catalyst containing 0.8 weight percent platinum and 0.8 weight chloride.

Each of the above catalysts were subjected to 18-hour hydroforming tests under standardized test conditions, employing about 20-25 gms. of catalyst in a quasi-isothermal reaction zone immersed in a molten salt bath for temperature control. The tests were carried out at a bath temperature of 900° F., a pressure of 250 p.s.i.g., a weight hourly space velocity of 2.3 and a once-through hydrogen rate of 5,000 standard cubic feet per barrel of feed. A Mid-Continent virgin naphtha having an ASTM boiling range of about 200–390° F. was employed as feed.

In each test the catalyst activity was calculated as the relative quantity, expressed as a percentage, of an arbitrarily-chosen reference catalyst, containing 0.6 percent platinum on alumina, required to produce a $C_5^+$ product fraction having the same octane number from the same Mid-Continent virgin naphtha feed under the same test conditions. The results of these tests are presented in Table I.

TABLE I.—ACTIVITY RESULTS

| Catalyst: | Activity |
|---|---|
| A—2% Zeolon-H | 275 |
| B—2% Na-Zeolon | 133 |
| C—2% Ca-Zeolon | 264 |
| D—2% Mg-Zeolon | 199 |
| E—2% Al-Zeolon | 120 |
| F—2% Ba-Zeolon | 143 |
| G—5% Zeolon-H | 267 |
| H—2% Hydrogen form Y sieve | 47 |
| I—Pt-$Al_2O_3$-Cl | 132 |

Thus, surprisingly, the catalysts containing mordenite structure zeolite possess good hydroforming activity comparable, and in some embodiments much higher, than commercially successful reforming catalyst. This activity is obtained without the use of any halogen promoter. Other forms of zeolite, such as Y-type, do not result in catalysts of sufficiently high activity to produce the high octane gasoline blending components needed to satisfy the octane requirements of modern automobile engines.

EXAMPLE II

Another series of catalysts was prepared. Each of these catalysts was tested in a unit similar to that employed in Example I. Catalysts L, M, N, and O were prepared and tested for this Example II.

Catalyst L was prepared by first blending 5.1 gms. of powdered Zeolon-H into 200 ml. of distilled water. To this blend were added 2,720 gms. of alumina sol (8.9 weight percent alumina) prepared by the American Cyanamid Company. After thorough blending, this mixture was gelled by adding 100 ml. of 10% ammonium hydroxide solution. The resulting gel was dried overnight at a temperature of 250° F. in air. The air rate employed for this drying, as well as for all other drying and calcining operations discussed hereinafter, was about 1.5 cubic feet per hour. The dried material was then calcined in air for two hours at a temperature of 900° F. The calcined material was then ground to pass through a 30-mesh sieve (U.S. Sieve), subsequently blended with about 4% Sterotex, and pelleted into ⅛" x ⅛" pellets. The pellets were then calcined in air for 3 hours at a temperature of 1,000° F. This material was prepared to contain about 2 weight percent Zeolon-H. A 50-gm. portion of this calcined material, ground to pass through a 20-mesh sieve and be retained upon a 40-mesh sieve (U.S. Sieve), was impregnated with a solution that had been prepared by dissolving 1.0 gm. of $H_2PtCl_6$ (40% platinum) and 2.0 gms. of $Al(NO_3)_3$ in 45 ml. of distilled water. The impregnated material was then dried for 3 hours in air at a temperature of 250° F. and subsequently calcined in air for 3 hours at a temperature of 1,000° F. This catalyst, Catalyst L, was prepared to contain 0.8 weight percent platinum and 0.8 weight percent chloride.

Catalyst M was prepared by drying an amount of an alumina sol prepared by the American Cyanamid Company that was sufficient to provide 98 gms. of the dried and calcined material. The drying was performed in air at a temperature of about 250° F. and the subsequent calcining was carried out for 3 hours in air at a temperature of 1,000° F. The calcined alumina was blended with 2 gms. of powdered Zeolon-H. The resulting blend was then ground to pass through a 100-mesh sieve (U.S. Sieve), blended with 4% Sterotex, copelleted into ⅛" x ⅛" pellets, and calcined in air for 3 hours at a temperature of 1,000° F. This material was prepared to contain 2 weight percent Zeolon-H. A 50-gm. portion of this co-pelleted material, ground to pass through a 20-mesh sieve and be retained on a 40-mesh sieve, was impregnated with a solution that had been prepared by dissolving 1.0 gm. of H₂PtCl₆ (40% platinum) and 2.0 gms. of Al(NO₃)₃ in 50 ml. of distilled water. The impregnated material was then dried in air for 3 hours at a temperature of 250° F. and subsequently calcined in air for 3 hours at a temperature of about 1,000° F. This catalyst, Catalyst M, was prepared to contain 0.8 weight percent platinum and 0.8 weight percent chloride.

Catalyst N was prepared by first blending 1,100 gms. of alumina sol (8.9 weight percent alumina) prepared by the American Cyanamid Company into a mixture of 2.0 gms. of Zeolon-H and 200 ml. of distilled water. After thorough blending, a solution that had been prepared by dissolving 2 gms. of H₂PtCl₆ in 100 ml. of distilled water was added to the mixture and thoroughly blended therewith. The sol was then gelled by adding thereto 100 ml. of a 10% ammonium hydroxide solution. The resulting gel was dried overnight in air at a temperature of 250° F. and subsequently calcined in air for 1 hour at a temperature of 900° F. The calcined material was ground to pass through a 30-mesh sieve (U.S. Sieve) and blended with 4% Sterotex. The material was then pelleted into ⅛″ x ⅛″ pellets and calcined in air for 3 hours at a temperature of 1,000° F. This catalyst, Catalyst N, was an embodiment of the catalytic composition of the present invention and was prepared to contain 0.8 weight percent platinum and 0.8 weight percent chloride.

Catalyst O was a commercially prepared platinum-containing reforming catalyst. It was prepared by the American Cyanamid Company and was sold as Aero-PHF-5 catalyst. It contained 0.8 weight percent platinum and 0.8 weight percent chloride. This catalyst, Catalyst O, did not contain any Zeolon-H.

Catalysts L, M, N, and O were subjected to activity tests in a unit similar to that described in Example I. The hydrocarbon feedstock that was employed for these tests was a stabilized reformate produced by mildly reforming a Mid-Continent naphtha to convert a major portion of the naphthenes therein into aromatics. The properties of this feedstock are presented in Table II.

TABLE II.—FEEDSTOCK PROPERTIES

Unleaded Research Octane No., CFR-R _____ 83.3
Gravity, ° API _____ 52.5
ASTM Distillation, ° F.
    IBP _____ 108
    10% _____ 182
    30% _____ 230
    50% _____ 255
    70% _____ 277
    90% _____ 310
    EP _____ 360

Hydrocarbon type (by mass spec.) vol. percent

Aromatics _____ 45.0
    Naphthenes _____ 4.5
    Olefins _____ --
    Paraffins _____ 50.5

The tests were carried out under the following conditions: the bath temperature in each case was set at 900° F.; the pressure was 300 psig; the weight hourly space velocity was maintained at 2.3 gms. of hydrocarbon per hour per gm. of catalyst; and the once-through hydrogen rate was held at about 5,000 standard cubic feet per barrel of feed (SCFB). The results of these tests are presented in Table III. Catalyst L was employed in two of the tests. Each period was 21 hours in length.

TABLE III.—TEST RESULTS

Catalyst:     Research Octane No., CFR-R
    L _____ 99.8
    L _____ 100.5
    M _____ 99.6
    N _____ 101.4
    O _____ 97.3

The octane number is an indication of the activity of the catalyst. The octane number produced by Catalyst N, the embodiment of the catalytic composition of the present invention, was higher than those provided by the other three catalysts. In addition, Catalyst N did not require as many steps in its preparation as did Catalyst L, which provided the next highest octane number. While Catalyst L had a drying step and a calcining step prior to the addition of the platinum-containing solution, Catalyst N was prepared by adding the platinum-containing solution directly to the hydrous Zeolon-H-alumina blend. Therefore, the initial drying and calcining steps were not present. This, of course, not only provides an economic incentive, but also a time-saving method of catalyst preparation, for the catalyst of the present invention.

EXAMPLE III

Catalysts L and N were tested in additional tests having longer test lengths than those employed in the test presented in Example II hereinabove. The tests were carried out similarly to those of Example II, but each consisted of three periods-on-oil. The data that were obtained from these latter tests are presented in Table IV.

TABLE IV.—TEST DATA

| | Catalyst | | | | | | |
|---|---|---|---|---|---|---|---|
| | L | L | L | N | N | N | N |
| Period | 1 | 2 | 3 | 1 | 2 | 3 | 4 |
| Hrs.-On-Oil | 21 | 45 | 69 | 21 | 45 | 69 | 93 |
| CFR-R | 101.3 | 100.3 | 100.2 | 102.4 | 100.6 | 101.9 | 99.3 |

Again Catalyst N, the embodiment of the present invention, appears to be the catalyst that provides the superior activity, i.e., the catalyst which furnishes higher octane numbers when the catalysts are tested under comparable conditions.

While the invention has been described with reference to certain specific embodiments thereof, it is to be understood that such embodiments are illustrative only and not by way of limitation. Numerous modifications and equivalents of the invention will be apparent from the foregoing description to those skilled in the art and such modifications and equivalents are to be deemed within the scope of the invention.

What is claimed is:

1. A hydrocarbon conversion catalyst which consists essentially of a co-catalytic solid support and a Group VIII noble metal, which support comprises (1) an adsorbent refractory inorganic oxide and (2) mordenite structure zeolite, said adsorbent refractory inorganic oxide being a member selected from the group consisting of alumina, silica gel, silica-alumina, magnesia-alumina, and zirconia-alumina, said zeolite having been introduced into said adsorbent refractory inorganic oxide by blending said zeolite in a finely-divided state into a sol or gel of said adsorbent refractory inorganic oxide prior to drying to form a zeolite-inorganic-oxide blend, said Group VIII noble metal having been incorporated into said zeolite-inorganic-oxide blend after said blending and prior to drying and calcining.

2. The catalyst of claim 1 wherein said adsorbent refractory inorganic oxide blend is alumina.

3. The catalyst of claim 2 wherein said Group VIII noble metal is platinum.

4. A hydrocarbon conversion catalyst comprising a Group VIII noble metal and a support having as major ingredients mordenite structure zeolite and an adsorbent refractory metal oxide, said adsorbent refractory metal oxide being a member selected from the group consisting of alumina, silica gel, silica-alumina, magnesia-alumina, and zirconia-alumina, said zeolite being in a form selected from the class consisting of an unexchanged cation form and ion-exchanged form containing at least one of the following cations: cations of Group I metals, cations of Group II metals, cations of Group III metals, ammonium ions, hydrogen ions, said zeolite having been introduced into said adsorbent refractory metal oxide by blending said zeolite in a finely-divided state into a sol or gel of said adsorbent refractory metal oxide to form a zeolite-adsorbent-refractory-metal-oxide blend, said Group VIII noble metal having been introduced into said zeolite-adsorbent-refractory-metal-oxide blend after said blending and prior to drying and calcining.

5. The catalyst of claim 4 wherein said adsorbent refractory metal oxide is alumina.

6. The catalyst of claim 5 wherein said Group VIII noble metal is platinum.

7. A process for hydroforming hydrocarbons which boil within the range between about 70° and about 500° F., which process comprises contacting said hydrocarbons under hydroforming conditions with a hydroforming catalyst, said conditions including a temperature between about 800° F. and about 1,050° F., a pressure between about 200 and 1,000 pounds per square inch, and the presence of hydrogen in an amount between about 2 and about 8 moles of hydrogen per mole of hydrocarbon, said catalyst consisting essentially of a co-catalytic solid support and a Group VIII noble metal, which support comprises (1) an adsorbent refractory inorganic oxide and (2) mordenite structure zeolite, said adsorbent refractory inorganic oxide being a member selected from the group consisting of alumina, silica gel, silica-alumina, magnesia-alumina, and zirconia-alumina, said zeolite having been introduced into said adsorbent refractory inorganic oxide by blending said zeolite in a finely-divided state into a sol or gel of said adsorbent refractory inorganic oxide to form a zeolite-inorganic-oxide blend prior to drying, said Group VIII noble metal having been incorporated into said zeolite-inorganic-oxide blend after said blending and prior to drying and calcining.

8. The process of claim 7 wherein said hydrocarbons boil within the range between about 180° and 400° F.

9. In an improved method for the preparation of a reforming catalyst wherein mordenite in a finely divided state is added to and blended with a sol or gel of alumina to form a mordenite-alumina blend and a Group VIII noble metal is added to the blend thereafter, the improvement which comprises adding the Group VIII noble metal to said blend after the blending of the mordenite with the alumina and prior to any drying and calcining of said blend.

10. The improved method of claim 9 wherein said Group VIII noble metal is platinum.

11. A catalytic composition for the reforming of a petroleum hydrocarbon feedstock selected from the group consisting of a virgin naphtha, a cracked naphtha and mixtures thereof and boiling within the range of about 70° to about 500° F., which catalytic composition comprises a co-catalytic solid support and a Group VIII noble metal, which support consists essentially of (1) an alumina selected from the group consisting of gamma-alumina, eta-alumina, and mixtures thereof and (2) mordenite, said mordenite having been introduced into said alumina by blending said mordenite in a finely divided state into a sol or gel of said alumina prior to drying to form a mordenite-alumina blend, said Group VIII noble metal having been incorporated into said mordenite-alumina blend after said blending and prior to drying and calcining.

12. The catalytic composition of claim 11 wherein said mordenite is in a form selected from the class consisting of an unexchanged cation form and an ion-exchanged form containing at least one of the following cations: cations of Group I metals, cations of Group II metals, cations of Group III metals, ammonium ions, and hydrogen ions.

13. The catalytic composition of claim 11 wherein said Group VIII noble metal is platinum.

14. The catalytic composition of claim 12 wherein said Group VIII noble metal is platinum.

15. A process for hydroforming a petroleum hydrocarbon feedstock which is selected from the group consisting of a virgin naphtha, a cracked naphtha, and mixtures thereof and which boils within the range of about 70° to about 500° F., which process comprises contacting said feedstock under hydroforming conditions with a hydroforming catalyst, said conditions comprising a temperature of about 800° F. to about 1,050° F., a maximum pressure of 1,000 pounds per square inch, and the presence of hydrogen in an amount between about 2 and about 8 mols of hydrogen per mol of hydrocarbon, said catalyst comprising a co-catalytic solid support and a Group VIII noble metal, which support consists essentially of (1) an alumina selected from the group consisting of gamma-alumina, eta-alumina, and mixtures thereof, and (2) mordenite, said mordenite having been introduced into said alumina by blending said mordenite in a finely divided state into a sol or gel of said alumina to form a mordenite-alumina blend prior to drying, said Group VIII noble metal having been incorporated into said mordenite-alumina blend after said blending and prior to drying and calcining.

16. The process of claim 15 wherein said petroleum hydrocarbon feed stock boils within the range of about 180° to about 400° F.

17. The process of claim 15 wherein said Group VIII noble metal of said catalyst is platinum.

18. The process of claim 15 wherein said pressure is within the range of about 50 pounds per square inch to about 1,000 pounds per square inch.

19. The process of claim 15 wherein said pressure is within the range of about 200 pounds per square inch to about 1,000 pounds per square inch.

20. A catalytic composition for the reforming of a feedstock selected from the group consisting of a virgin naphtha, a cracked naphtha and mixtures thereof and boiling within the range of about 70° to about 500° F., which catalytic composition consists essentially of a cocatalytic solid support and a Group VIII noble metal, which support comprises (1) an alumina selected from the group consisting of gamma-alumina, eta-alumina, and mixtures thereof and (2) mordenite, said mordenite having been introduced into said alumina by blending said mordenite in a finely divided state into a sol or gel of said alumina prior to drying to form a mordenite-alumina blend, said Group VIII noble metal having been incorporated into said mordenite-alumina blend after said blending and prior to drying and calcining.

21. The catalytic composition of claim 20 wherein said mordenite is in a form selected from the class consisting of an unexchanged cation form and an ion-exchanged form containing at least one of the following cations: cations of Group I metals, cations of Group II metals, cations of Group III metals, ammonium ions, and hydrogen ions.

22. The catalytic composition of claim 20 wherein said Group VIII noble metal is platinum.

23. The catalytic composition of claim 21 wherein said Group VIII noble metal is platinum.

24. A catalytic composition for the reforming of a feedstock selected from the group consisting of a virgin naphtha, a cracked naphtha, and mixtures thereof and boiling within the range of about 70° to about 500° F., which catalytic composition consists essentially of a cocatalytic solid support and a Group VIII noble metal, which support consists essentially of (1) an alumina selected from the group consisting of gamma-alumina, eta-alumina, and mixtures thereof and (2) mordenite, said mordenite having been introduced into said alumina by blending said mordenite in a finely divided state into a sol or gel of said alumina prior to drying to form a mordenite-alumina blend, said Group VIII noble metal having been incorporated into said mordenite-alumina blend after said blending and prior to drying and calcining.

25. The catalyst of claim 24 wherein said mordenite is present in an amount within the range of about 0.1 to about 25 weight percent, said alumina is present in an amount within the range of about 75 to about 99.9 weight percent, and said Group VIII noble metal is present in an amount within the range of about 0.01 to about 10 weight percent.

References Cited

UNITED STATES PATENTS

| | | | |
|---|---|---|---|
| 3,140,253 | 7/1964 | Plank et al. | 208—120 |
| 3,267,022 | 8/1966 | Hansford | 208—111 |

HERBERT LEVINE, Primary Examiner

U.S. Cl. X.R.

252—455